US007831225B2

(12) United States Patent
Sims, III et al.

(10) Patent No.: US 7,831,225 B2
(45) Date of Patent: Nov. 9, 2010

(54) RADIO FREQUENCY POWER LOAD AND ASSOCIATED METHOD

(75) Inventors: William Herbert Sims, III, New Market, AL (US); Donald Gregory Chavers, Somerville, AL (US); James J. Richeson, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 621 days.

(21) Appl. No.: 11/828,590

(22) Filed: Jul. 26, 2007

(65) Prior Publication Data

US 2009/0029669 A1 Jan. 29, 2009

(51) Int. Cl.
*H04B 1/04* (2006.01)
*H01Q 11/12* (2006.01)

(52) U.S. Cl. .................................... 455/120; 455/127.1

(58) Field of Classification Search ................. 455/117, 455/120, 121, 127.1, 127.5; 330/289, 143
See application file for complete search history.

(56) References Cited

U.S. PATENT DOCUMENTS 3,678,749 A * 7/1972 Harper ..................... 73/304 R
5,198,153 A 3/1993 Angelopoulos et al.
6,242,735 B1 * 6/2001 Li et al. ...................... 250/288
6,331,356 B1 12/2001 Angelopoulos et al.
6,600,142 B2 7/2003 Ryan et al.
6,707,671 B2 3/2004 Yamashita et al.
6,887,339 B1 5/2005 Goodman et al.
6,914,226 B2 7/2005 Ottaway
7,041,535 B2 5/2006 Yamashita et al.
2002/0001627 A1 * 1/2002 Nerreter et al. ............. 424/618
2003/0042977 A1 * 3/2003 Kanda ......................... 330/10
2003/0218566 A1 * 11/2003 Feldle et al. ................ 342/175
2006/0137613 A1 * 6/2006 Kasai ................. 118/723 MW

* cited by examiner

*Primary Examiner*—Nguyen Vo
(74) *Attorney, Agent, or Firm*—Marlin R. Smith; James J. McGroary

(57) ABSTRACT

A radio frequency power load and associated method. A radio frequency power load apparatus includes a container and a fluid having an ion source therein, the fluid being contained in the container. Two conductors are immersed in the fluid. A radio frequency transmission system includes a radio frequency transmitter, a radio frequency amplifier connected to the transmitter and a radio frequency power load apparatus connected to the amplifier. The apparatus includes a fluid having an ion source therein, and two conductors immersed in the fluid. A method of dissipating power generated by a radio frequency transmission system includes the steps of: immersing two conductors of a radio frequency power load apparatus in a fluid having an ion source therein; and connecting the apparatus to an amplifier of the transmission system.

20 Claims, 2 Drawing Sheets

RADIO FREQUENCY POWER LOAD AND ASSOCIATED METHOD

ORIGIN OF THE INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION

1. Field of the Invention

The present invention relates generally to radio frequency transmission systems and, in an embodiment described herein, more particularly provides a radio frequency power load and associated method.

2. Description of Related Art

Typical conventional radio frequency (RF) power loads are large and cumbersome for a given power level handling capability. Generally, RF power loads are made up of carbon piles that have a characteristic impedance of fifty ohms.

Very high power modules are water cooled (for cooling of the carbon piles) and are very large. Typical RF power loads are also very expensive and difficult to maintain.

U.S. Pat. No. 6,887,339 to Goodman, et al. discloses an RF power supply with an integrated impedance matching network. However, this patent does not describe any solution to the need for improved RF power loads.

Therefore, it can be seen that it would be quite desirable to provide an improved RF power load. The improved RF power load would preferably be cost-effective, and would dissipate hundreds of kilowatts of RF power in a safe and efficient manner. It is accordingly among the objects of the present invention to provide such an improved RF power load.

SUMMARY OF THE INVENTION

In carrying out the principles of the present invention, in accordance with an embodiment thereof, an improved radio frequency power load and associated method are described below. An example of the power load has two conductor rods immersed in a water and salt mixture.

In one aspect of the invention, a radio frequency power load apparatus is provided. The apparatus includes a container and a fluid having an ion source therein. The fluid is contained in the container, and two conductors are immersed in the fluid.

The fluid may include water, and the ion source may include a salt.

In another aspect of the invention, a radio frequency transmission system is provided which includes a radio frequency transmitter and a radio frequency amplifier connected to the transmitter. A radio frequency power load apparatus is connected to the amplifier. The apparatus includes a fluid having an ion source therein, and two conductors immersed in the fluid.

In yet another aspect of the invention, a method of dissipating power generated by a radio frequency transmission system is provided. The method includes the steps of: immersing two conductors of a radio frequency power load apparatus in a fluid having an ion source therein; and connecting the radio frequency power load apparatus to an amplifier of the transmission system.

The power generated by the radio frequency transmission system is converted into heat in the fluid. An impedance matching circuit is interconnected between the conductors and the amplifier. A predetermined length of coax line is connected to the impedance matching circuit to thereby achieve a desired capacitive load at a selected transmitted frequency.

These and other features, advantages, benefits and objects of the present invention will become apparent to one of ordinary skill in the art upon careful consideration of the detailed description of representative embodiments of the invention herein below and the accompanying drawings.

DETAILED DESCRIPTION

It is to be understood that the embodiments are described merely as examples of useful applications of the principles of the invention, which is not limited to any specific details of these embodiments.

Figure 1:
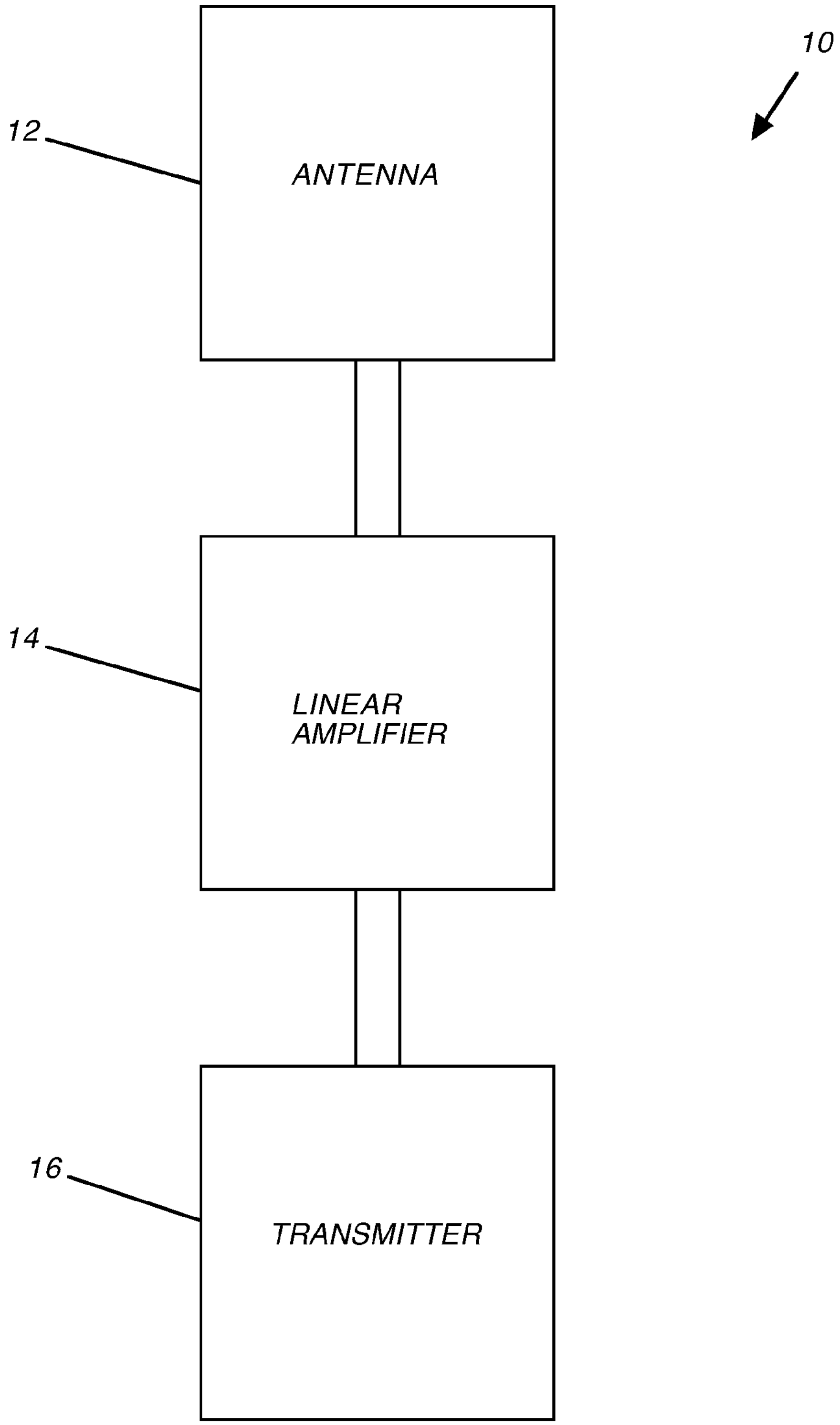
FIG. 1 is a schematic view of an RF transmission system which benefits from the principles of the present invention.

Referring initially to FIG. 1, an RF transmission system 10 is representatively and schematically illustrated. In the system 10, a transmitter 16 is connected to a linear amplifier 14, which is connected to an antenna 12. Although the system 10 is depicted as being used for RF transmission, it will be appreciated that the system could include a receiver, in which case the transmitter 16 could instead be a transceiver, if desired.

In one embodiment, the transmitter 16 could be a commercially available Yaesu FT-840 HF (2-30 MHz) transceiver capable of 100 watts output power. The amplifier 14 could be a commercially available A-Comm A2000A HF linear amplifier which generates up to 2 kilowatts of power.

In another embodiment, the system 10 could be capable of providing up to 16 kilowatts of power to the antenna 12. In this embodiment, the amplifier preferably includes four modules, with each module containing four 1 kilowatt modules (known as a "quad" module) and associated combiner, splitter and protection circuitry. Each quad module includes four 1 kilowatt modules, a power divider and an external power combiner. Each of the power dividers and combiners are four-part, zero-degree phase inputs. Careful attention is paid to cable lengths (i.e., the cable lengths are exactly the same for every RF pathway).

Each of the 1 kilowatt modules includes three stages of RF amplification—an input stage, a driver stage and a final amplification stage. Seventy-five milliwatts input RF power will generate 1 kilowatt of output RF power. Each amplifier includes a power amplifier, a four-port directional coupler, automatic level control (ALC) protection circuitry, PIN diode attenuator and a four-port power splitter.

The high power combining is accomplished with an external combiner. External 65 VDC, 12.5 VDC and −15 VDC is supplied to each of the quad modules, then distributed internally to all four individual 1 kilowatt modules. A +15 VDC supply voltage is generated internally from the 65 VDC for ALC use.

All four power amplifiers are mounted to a water cooled cold plate capable of dissipating the approximately 4 to 8 kilowatts of excess heat generated by the power devices.

Each one of the quad modules has the ALC protection circuitry to protect from over-power, high VSWR and high current, and will maintain a selected constant output power (variable from 0 to 1 kilowatt) from 2 to 30 MHz. The ALC circuitry has a response time on the order of 10 milliseconds to fold back the power should one of four monitored levels go beyond safe operating ranges, in order to protect the RF devices.

The four monitored levels are forward power, reflected power, instantaneous current and an external ALC control (used for wave shaping if required). The forward power and reflected power use a 1.5 kilowatt −30 dB directional coupler to sample the forward and reflected components of the output RF power. The forward power level is infinitely variable from 0 to 1 kilowatt. The reflected power level is monitored so that, when the reflected power reaches 100 watts, then the ALC will reduce the output power to a point that a maximum of 100 watts is allowed, regardless of the output power.

For example, if the amplifier was operated into an open (or short) the reflected power equals the forward power and the total output power from the amplifier will be limited by the forward power setting.

The monitored instantaneous current level is the instantaneous DC current into the RF module. This is accomplished by inserting a 0.05 ohm resistor in series with the 65 VDC power going to the RF devices. When the current monitor detects current above a predetermined level (e.g., 30 amps), the current monitor will begin to fold back the power to maintain a safe operating level.

The external ALC control is an external voltage level, from 0 to 5 VDC, where a level of 0 corresponds to no ALC and a level of 5 corresponds to full ALC control. In this way, an external way of shaping the RF waveform can be accomplished.

If the amplifier is operating correctly, the forward power portion of the ALC is the limiting factor of the RF output power. As the reflected power level or instantaneous current level rises, then the output power will be reduced accordingly.

The way the ALC controls the output RF power is to feed the ALC output to the PIN diode attenuator, which controls the input drive RF to the in RF stage. The PIN diode attenuator can attenuate from 0 to 60 dB and is infinitely variable.

Figure 2:
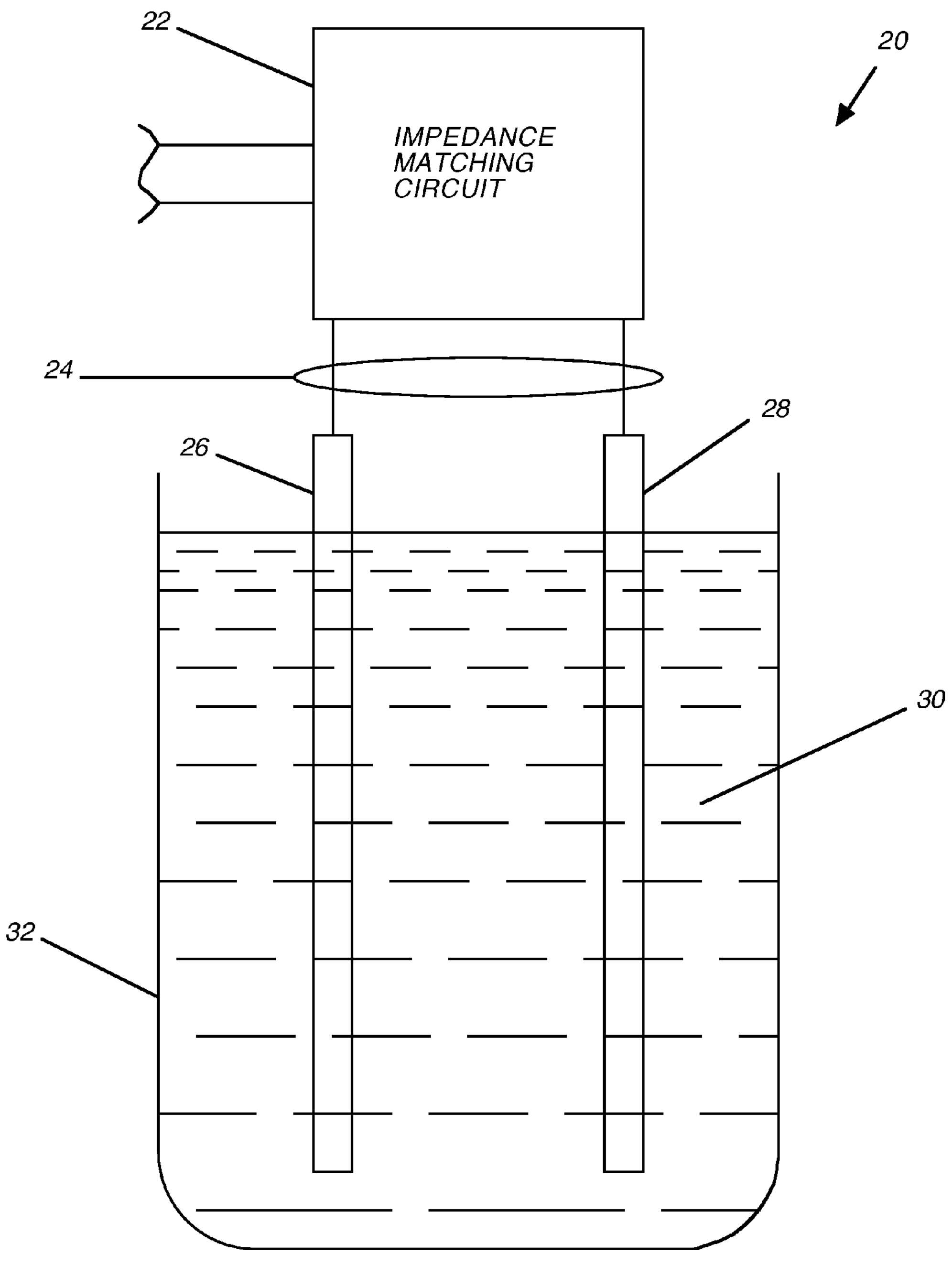
FIG. 2 is a schematic view of an RF power load apparatus for use with the system of FIG. 1.

Referring additionally now to FIG. 2, an RF power load apparatus 20 for use with the RF transmission system 10 of FIG. 1 is representatively illustrated. Of course, the apparatus 20 could be used with other types of RF transmission systems, if desired.

As depicted in FIG. 2, the apparatus 20 includes an impedance matching circuit 22 connected via a coax (coaxial cable) 24 to two conductors 26, 28 immersed in a fluid 30 having an ion source therein. The fluid 30 is contained in a container 32.

The impedance matching circuit 22 is preferably connected to the amplifier 14 of the RF transmission system 10 in place of the antenna 12. The circuit 22, the length of the coax 24 and the composition of the fluid 30 mixture are "tuned" for a selected RF transmission frequency.

The impedance matching circuit 22 provides a precise value of inductance for the selected frequency. A predetermined length of the coax 24 is used to achieve a capacitive load at the selected frequency. The mixture of components in the fluid 30 is adjusted to provide a desired impedance (e.g., 50 ohms).

The fluid 30 is preferably entirely, or mostly, water. Thus, this component of the apparatus 20 is readily available and inexpensive. The ion source in the fluid 30 is preferably a salt (such as NaCl), which is also readily available and inexpensive.

However, it should be understood that other types of fluids and ion sources, and combinations thereof, may be used in keeping with the principles of the invention. For example, a gel could be used for the fluid 30, etc.

The container 32 is preferably made of a non-conducting material, such as plastic. The conductors 26, 28 are preferably metal rods.

When the RF power is transmitted through the conductors 26, 28, the fluid 30 provides an impedance between the conductors and, as a result, the RF power is dissipated into the fluid as heat. Due to the mass of the fluid 30, temperature increase in the fluid is not instantaneous.

Thus, the RF power is dissipated in a controlled, safe and reliable manner. The quantity of the fluid 30 and the mixture of components therein may be conveniently adjusted to produce a desired impedance and heat absorbing mass to dissipate virtually any expected level of RF power. Hundreds of kilowatts of RF power can easily be dissipated using the apparatus 20.

The foregoing detailed description is to be clearly understood as being given by way of illustration and example only, the spirit and scope of the present invention being limited solely by the appended claims.

What is claimed is:

1. A radio frequency power load apparatus, comprising:
- a container;
- a fluid having an ion source therein, the fluid being contained in the container;
- two conductors immersed in the fluid, wherein the conductors are in electrical contact with the fluid; and
- an impedance matching circuit interconnected between the conductors and an amplifier of a radio frequency transmission system.

2. The apparatus of claim 1, wherein the fluid is water.

3. The apparatus of claim 1, wherein the ion source is a salt.

4. The apparatus of claim 1, wherein the container is made of a non-conducting material.

5. The apparatus of claim 1, further comprising a predetermined length of coax line connected to the impedance matching circuit to thereby achieve a desired capacitive load at a selected transmitted frequency.

6. The apparatus of claim 1, wherein an impedance of the apparatus is approximately fifty ohms.

7. A radio frequency transmission system, comprising:
- a radio frequency transmitter;
- a radio frequency amplifier connected to the transmitter; and
- a radio frequency power load apparatus connected to the amplifier, the apparatus including a fluid having an ion source therein, and two conductors immersed in the fluid,
- wherein the ion source provides electrical conductivity between the conductors.

8. The system of claim 7, wherein the fluid is water.

9. The system of claim 7, wherein the ion source is a salt.

10. The system of claim 7, wherein the fluid is contained in a container made of a non-conducting material.

11. The system of claim 7, further comprising an impedance matching circuit interconnected between the conductors and the amplifier.

12. The system of claim 11, further comprising a predetermined length of coax line connected to the impedance matching circuit to thereby achieve a desired capacitive load at a selected transmitted frequency.

13. The system of claim 7, wherein an impedance of the radio frequency power load apparatus is approximately fifty ohms.

14. A method of dissipating power generated by a radio frequency transmission system, the method comprising the steps of:

immersing two conductors of a radio frequency power load apparatus in a fluid having an ion source therein;

connecting the radio frequency power load apparatus to an amplifier of the transmission system; and transmitting electrical current between the conductors and through the fluid.

15. The method of claim 14, further comprising the step of providing the fluid including water.

16. The method of claim 14, further comprising the step of providing the ion source including a salt.

17. The method of claim 14, further comprising the step of converting the power generated by the radio frequency transmission system into heat in the fluid.

18. The method of claim 14, further comprising the step of interconnecting an impedance matching circuit between the conductors and the amplifier.

19. The method of claim 18, further comprising the step of connecting a predetermined length of coax line to the impedance matching circuit to thereby achieve a desired capacitive load at a selected transmitted frequency.

20. A radio frequency power load apparatus, comprising:

a container;

a fluid having an ion source therein, the fluid being contained in the container;

two conductors immersed in the fluid;

an impedance matching circuit interconnected between the conductors and an amplifier of a radio frequency transmission system; and a predetermined length of coax line connected to the impedance matching circuit to thereby achieve a desired capacitive load at a selected transmitted frequency.

* * * * *